US012610158B2

(12) United States Patent
Hwang

(10) Patent No.: US 12,610,158 B2
(45) Date of Patent: Apr. 21, 2026

(54) IMAGE SENSING DEVICE AND IMAGING DEVICE

(71) Applicant: SK hynix Inc., Gyeonggi-do (KR)

(72) Inventor: Won Seok Hwang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 141 days.

(21) Appl. No.: 18/587,963

(22) Filed: Feb. 27, 2024

(65) Prior Publication Data

US 2025/0119655 A1 Apr. 10, 2025

(30) Foreign Application Priority Data

Oct. 5, 2023 (KR) ........................ 10-2023-0132244

(51) Int. Cl.
| | |
|---|---|
| *H04N 25/583* | (2023.01) |
| *G06T 3/4015* | (2024.01) |
| *H04N 25/533* | (2023.01) |
| *H04N 25/585* | (2023.01) |
| *H04N 25/77* | (2023.01) |
| *H04N 25/778* | (2023.01) |
| *H04N 25/78* | (2023.01) |
| *H10F 39/18* | (2025.01) |

(52) U.S. Cl.
CPC ......... *H04N 25/583* (2023.01); *H04N 25/533* (2023.01); *H04N 25/585* (2023.01); *H04N 25/77* (2023.01)

(58) Field of Classification Search
CPC .... H04N 25/77; H04N 25/533; H04N 25/583; H04N 25/585; H04N 25/57; H04N 25/62;
H04N 25/778; H04N 25/78; H10F 39/18; H10F 39/811; H10F 39/8023; H10F 39/182; G06T 3/4015

See application file for complete search history.

(56) References Cited

U.S. PATENT DOCUMENTS

| | | | | |
|---|---|---|---|---|
| 9,215,327 | B2 * | 12/2015 | Kimura | ............... H04N 25/533 |
| 10,986,316 | B2 | 4/2021 | Komori et al. | |
| 12,183,750 | B2 * | 12/2024 | Cho | ..................... H10F 39/8063 |
| 2015/0312461 | A1 * | 10/2015 | Kim | ...................... H04N 25/778 |
| | | | | 348/308 |
| 2016/0330392 | A1 * | 11/2016 | Solhusvik | .............. H04N 25/79 |
| 2018/0343404 | A1 * | 11/2018 | Hwang | .................. H04N 25/59 |
| 2024/0430591 | A1 * | 12/2024 | Machida | ............... H04N 25/79 |

FOREIGN PATENT DOCUMENTS

KR 10-2354991 B1 1/2022

\* cited by examiner

*Primary Examiner* — Marly S Camargo
(74) *Attorney, Agent, or Firm* — IP & T GROUP LLP

(57) ABSTRACT

An image sensing device for generating a high dynamic range (HDR) image is disclosed. The image sensing device includes a first pixel configured to generate a first pixel signal based on light received during a first exposure time, and a second pixel configured to share a floating diffusion region with the first pixel and to generate a second pixel signal based on light received during a second exposure time different from the first exposure time. When the floating diffusion region is reset based on a pixel reset signal in a first period, a reset signal is read out, the first pixel signal is read out in a second period, and the second pixel signal is read out in a third period. The first period, the second period, and the third period are included in one frame.

16 Claims, 6 Drawing Sheets

100

100

100

Figure 4:
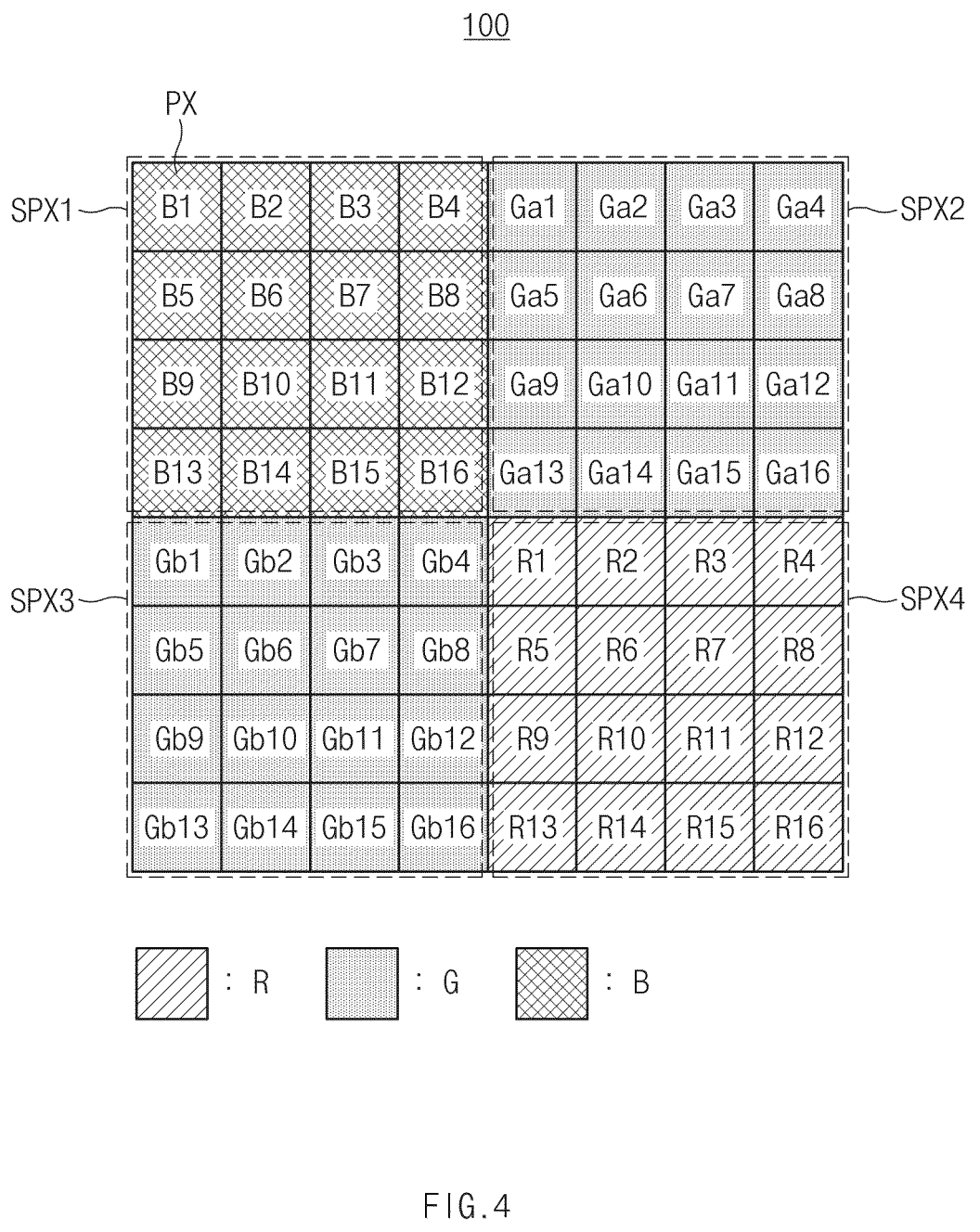

100

PX

SPX1

| B1 | B2 | B3 | B4 | Ga1 | Ga2 | Ga3 | Ga4 |
| B5 | B6 | B7 | B8 | Ga5 | Ga6 | Ga7 | Ga8 |
| B9 | B10 | B11 | B12 | Ga9 | Ga10 | Ga11 | Ga12 |
| B13 | B14 | B15 | B16 | Ga13 | Ga14 | Ga15 | Ga16 |
| Gb1 | Gb2 | Gb3 | Gb4 | R1 | R2 | R3 | R4 |
| Gb5 | Gb6 | Gb7 | Gb8 | R5 | R6 | R7 | R8 |
| Gb9 | Gb10 | Gb11 | Gb12 | R9 | R10 | R11 | R12 |
| Gb13 | Gb14 | Gb15 | Gb16 | R13 | R14 | R15 | R16 |

SPX2

SPX3

SPX4

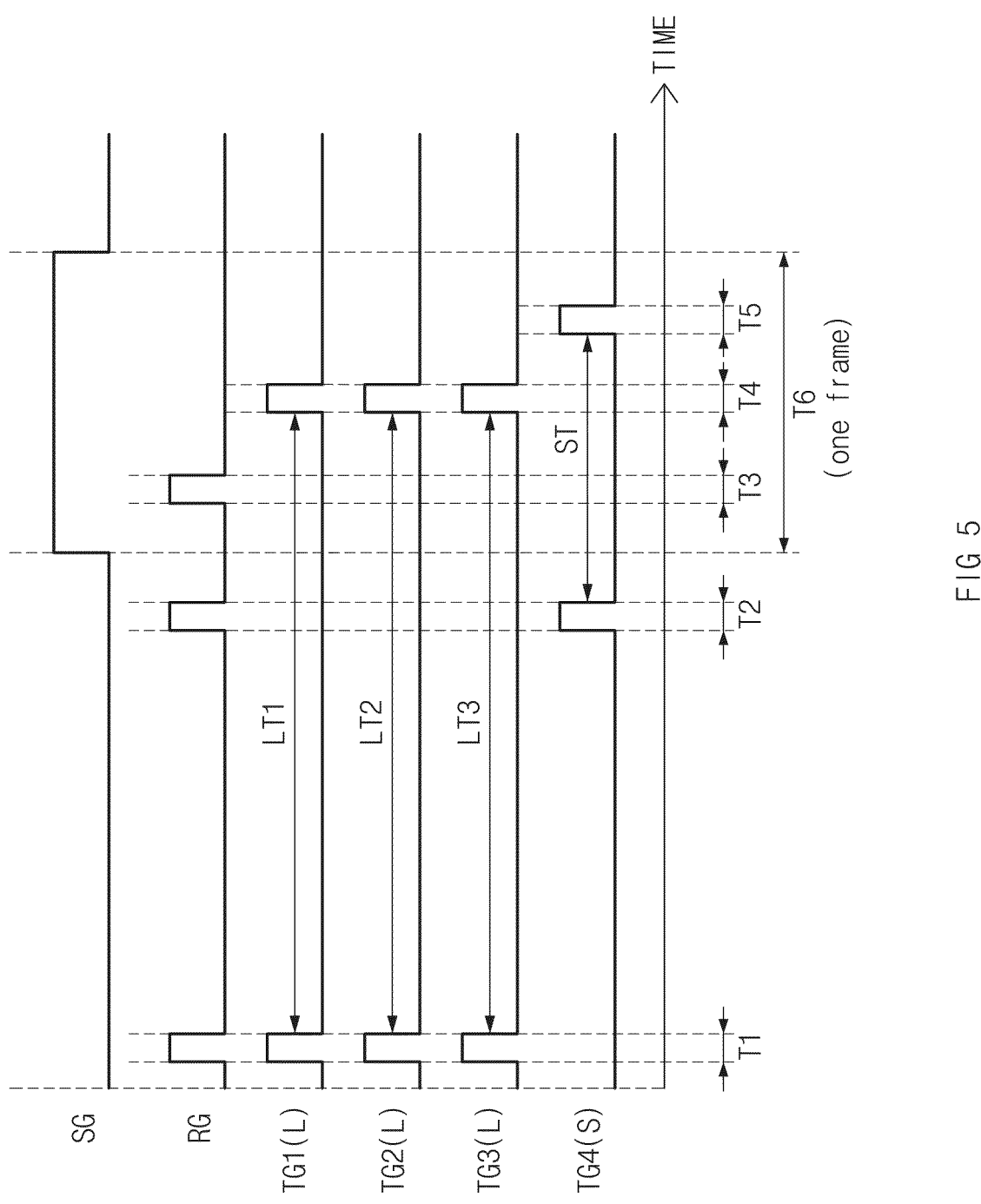
F I G 5

IMAGE SENSING DEVICE AND IMAGING DEVICE

CROSS-REFERENCE TO RELATED APPLICATION

This application claims priority to, and the benefits of, Korean patent application No. 10-2023-0132244, filed on Oct. 5, 2023, which is incorporated herein by reference in its entirety.

TECHNICAL FIELD

The technology, implementations, and embodiments disclosed in the present disclosure generally relate to an image sensing device capable of generating a high dynamic range (HDR) image.

BACKGROUND

An image sensing device is a device for capturing optical images by converting light into electrical signals using a photosensitive semiconductor material which reacts to light. With the development of automotive, medical, computer and communication industries, the demand for high-performance image sensing devices has been increasing in various fields such as smart phones, smart wearable devices, digital cameras, game machines, IoT (Internet of Things), robots, surveillance cameras and medical micro cameras.

Recently, to provide high-quality images, interest in HDR images is rapidly increasing, and various techniques capable of acquiring HDR images are being developed. Among such techniques, staggered HDR (or line-based HDR) technology may be used to create an HDR image by merging two or more exposures captured for a frame of a scene. Here, the two or more exposures may have different exposure times (e.g., a long exposure time and a short exposure time for the frame of a scene).

However, the staggered HDR technology may perform a readout operation several times to output data of each exposure time, resulting in an increased number of readout operations. In addition, the staggered HDR technology may increase the amount of noise when merging image signals having different exposure times.

SUMMARY

In accordance with an embodiment of the present disclosure, an image sensing device may include a first pixel configured to generate a first pixel signal based on light received during a first exposure time, and a second pixel configured to share a floating diffusion region with the first pixel and to generate a second pixel signal based on light received during a second exposure time different from the first exposure time. When the floating diffusion region is reset based on a pixel reset signal in a first period, a reset signal is read out, the first pixel signal is read out in a second period, and the second pixel signal is read out in a third period. The first period, the second period, and the third period are included in one frame.

In accordance with another embodiment of the present disclosure, an imaging device may include an image sensing device including a pixel array configured to generate a plurality of pixel signals having different sensitivities based on received light, and an image signal processor configured to generate an image by synthesizing the plurality of pixel signals. The pixel array may include a first pixel configured to generate a first pixel signal based on light received during a first exposure time; a second pixel configured to share a floating diffusion region with the first pixel and to generate a second pixel signal based on light received during the first exposure time; and a third pixel configured to share a floating diffusion region with the first pixel and the second pixel, and to generate a third pixel signal based on light received during a second exposure time different from the first exposure time. When the floating diffusion region is reset based on a pixel reset signal in a first period, a reset signal is read out, the first pixel signal and the second pixel signal are summed and read out in a second period, and the third pixel signal is read out in a third period.

In accordance with another embodiment of the present disclosure, an image sensing device may include a first pixel including a first photoelectric conversion element configured to generate and accumulate charges based on intensity of light, and a first transfer transistor connected between the first photoelectric conversion element and a floating diffusion region and configured to be controlled by a first transfer signal, whereby an electrical signal corresponding to the floating diffusion region that was reset is output as a first pixel signal; a second pixel including a second photoelectric conversion element configured to generate and accumulate charges based on the intensity of light, and a second transfer transistor connected between the second photoelectric conversion element and the floating diffusion region and configured to be controlled by a second transfer signal, whereby an electrical signal corresponding to the floating diffusion region that was reset is output as a second pixel signal; and a third pixel including a third photoelectric conversion element configured to generate and accumulate charges based on the intensity of light, and a third transfer transistor connected between the third photoelectric conversion element and the floating diffusion region and configured to be controlled by a third transfer signal, whereby an electrical signal corresponding to the floating diffusion region that was reset is output as a third pixel signal. When the floating diffusion region is reset based on a pixel reset signal in a first period, a reset signal is read out, the first pixel signal and the second pixel signal are summed and read out in a second period, and the third pixel signal is read out in a third period.

BRIEF DESCRIPTION OF THE DRAWINGS

The above and other features and beneficial aspects of the disclosed technology will become readily apparent with reference to the following detailed description when considered in conjunction with the accompanying drawings.

FIGS. 3 and 4 are schematic diagrams illustrating examples of a pixel array for use in an image sensing device based on some embodiments of the present disclosure.

FIG. 5 is a timing diagram illustrating example operations of a sub-pixel array shown in FIG. 4 based on some embodiments of the present disclosure.

DETAILED DESCRIPTION

Figure 1:
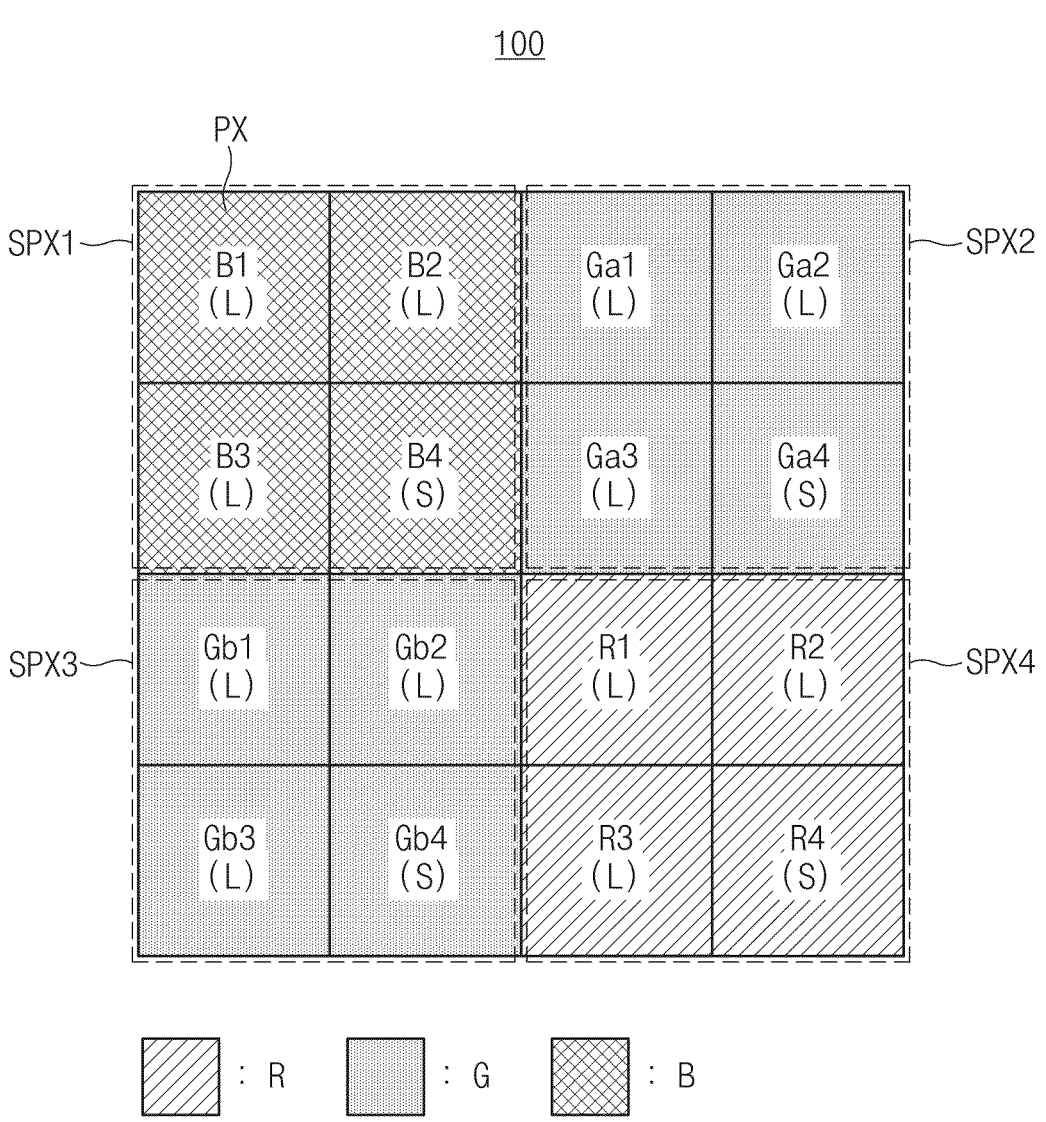
FIG. 1 is a schematic diagram illustrating an example of pixels having different exposure times in a pixel array for use in an image sensing device based on some embodiments of the present disclosure.

The present disclosure provides embodiments and examples of an image sensing device capable of generating a high dynamic range (HDR) image that may be used in configurations to substantially address one or more technical or engineering issues and to mitigate limitations or disadvantages encountered in some image sensing devices in the art. Some embodiments of the present disclosure relate to an image sensing device that can reduce the amount of noise during a readout action while reducing loss of a frame rate. In recognition of the issues above, the image sensing device based on some embodiments of the present disclosure can reduce the amount of noise during a readout action while reducing loss of a frame rate.

Reference will now be made in detail to some embodiments of the present disclosure, examples of which are illustrated in the accompanying drawings. Wherever possible, the same reference numbers will be used throughout the drawings to refer to the same or like parts. While the present disclosure is susceptible to various modifications and alternative forms, specific embodiments thereof are shown by way of example in the drawings. However, the present disclosure should not be construed as being limited to the embodiments set forth herein.

Hereinafter, various embodiments of the present disclosure will be described with reference to the accompanying drawings. However, it should be understood that the disclosed technology is not limited to specific embodiments, but includes various modifications, equivalents and/or alternatives of the embodiments. The embodiments of the present disclosure may provide a variety of effects capable of being directly or indirectly recognized through the disclosed technology.

Various embodiments of the present disclosure relate to an image sensing device that can reduce the amount of noise during a readout action while reducing loss of a frame rate.

It is to be understood that both the foregoing general description and the following detailed description of the present disclosure are illustrative and descriptive and are intended to provide further description of the embodiments of the present disclosure as claimed.

FIG. 1 is a schematic diagram illustrating an example of pixels having different exposure times in a pixel array 100 for use in an image sensing device based on some embodiments of the present disclosure.

High dynamic range (HDR) technology may refer to technology that captures the same object with different exposure times to create a plurality of capture images obtained at different exposure times and processes the plurality of capture images to increase a dynamic range of such images.

FIG. 1 is a diagram illustrating an example of sub-pixel arrays (SPXs) classified according to different exposure times to generate an HDR image.

Referring to FIG. 1, the pixel array 100 may include a plurality of sub-pixel arrays (SPX1~SPX4). Each of the plurality of sub-pixel arrays (SPX1~SPX4) may include a plurality of pixels (PXs) including filters of the same color. A plurality of pixels (PXs) adjacent to each other in row and column directions of each of the plurality of sub-pixel arrays (SPX1~SPX4) may share one floating diffusion region (FD).

For example, the pixel array 100 shown in FIG. 1 may have a pattern (so-called "quad-pattern") in which the sub-pixel arrays (SPX1~SPX4), each of which includes (2×2) pixels, are repeatedly arranged in the row and column directions of the pixel array 100.

Figure 2:
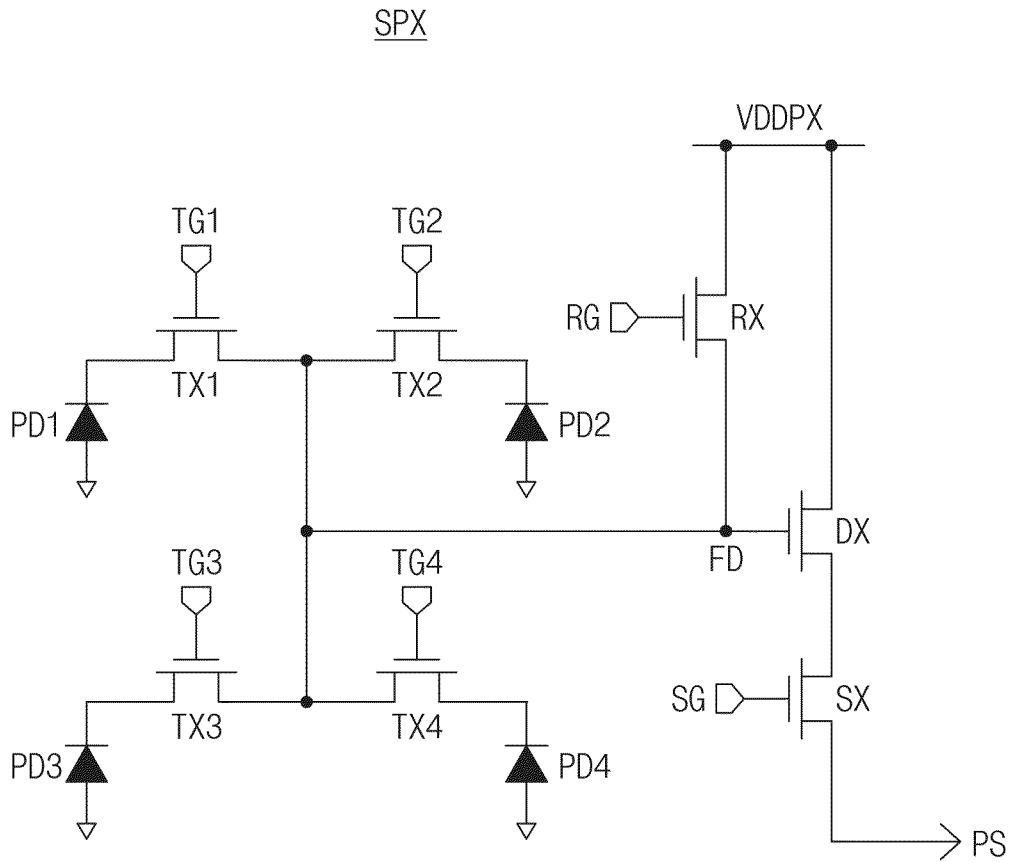
FIG. 2 is a detailed circuit diagram illustrating an example of a sub-pixel array shown in FIG. 1 based on some embodiments of the present disclosure.

For example, the sub-pixel array (SPX1) may include (2×2) pixels (i.e., a total of 4 pixels, B1~B4) including filters of the same color (e.g., blue 'B') and the (2×2) pixels may share one floating diffusion region (FD, see FIG. 2). The sub-pixel array (SPX2) may include (2×2) pixels (i.e., a total of 4 pixels, Ga1~Ga4) including filters of the same color (e.g., green 'G') and the (2×2) pixels may share one floating diffusion region (FD). The sub-pixel array (SPX3) may include (2×2) pixels (i.e., a total of 4 pixels, Gb1~Gb4) including filters of the same color (e.g., green 'G') and the (2×2) pixels may share one floating diffusion region (FD). The sub-pixel array (SPX4) may include (2×2) pixels (i.e., a total of 4 pixels, R1~R4) including filters of the same color (e.g., red 'R') and the (2×2) pixels may share one floating diffusion region (FD).

Although the above-described pixel array 100 has been described as including red, green and blue filters for convenience of description and better understanding of the disclosed technology, the scope or spirit of the present disclosure is not limited thereto and at least one of various colors can be sensed by a unit color pixel. In another example, the pixels (PXs) may include color filters such as yellow color filters, cyan color filters, magenta color filters, etc.

As can be seen from FIG. 1, although the pixel array 100 based on some embodiments of the present disclosure is shown as including four sub-pixel arrays (SPX1~SPX4) for convenience of description, the number of sub-pixel arrays to be used for the pixel array 100 is not limited thereto.

In addition, the pixel array 100 based on some embodiments of the present disclosure is shown as including a quad pattern, but other embodiments are also possible and it should be noted that arrangement of the pixels (PXs) can be implemented in various ways and the pattern of the pixel array 100 is not limited thereto.

The pixels (PXs) of the pixel array 100 may be classified into long-exposure pixels and short-exposure pixels. Here, the long-exposure pixel may refer to a pixel that is continuously exposed within a predetermined exposure time to generate a pixel signal. In addition, the short-exposure pixel may refer to a pixel that is intermittently exposed within a predetermined exposure time to generate a pixel signal.

Hereinafter, the pixel (PX) marked with 'L' represents a long-exposure pixel and the pixel (PX) marked with 'S' represents a short-exposure pixel for convenience of description. In some embodiments, pixels (B4, Ga4, Gb4, R4) shown in FIG. 1 may be short-exposure pixels and the remaining pixels (B1~B3, Ga1~Ga3, Gb1~Gb3, R1~R3) other than the pixels (B4, Ga4, Gb4, R4) may be long-exposure pixels.

That is, the pixel array 100 may generate an HDR image based on two different exposure times. Each of the sub-pixel arrays (SPX1~SPX4) may generate a pixel signal during an exposure time selected from among a first exposure time and a second exposure time shorter than the first exposure time. The long-exposure pixels (B1~B3, Ga1~Ga3, Gb1~Gb3, R1~R3) may generate pixel signals during the first exposure time. The short-exposure pixels (B4, Ga4, Gb4, R4) may generate pixel signals during the second exposure time.

However, the pixel array 100 shown in FIG. 1 is merely an example embodiment, the scope or spirit of the disclosed technology is not limited thereto and it should be noted that a pixel array in which long-exposure pixels and short-exposure pixels are arranged in various ways can also be implemented.

FIG. 2 is a detailed circuit diagram illustrating an example of the sub-pixel array (SPX) shown in FIG. 1 based on some embodiments of the present disclosure.

The sub-pixel array (SPX) of FIG. 2 may correspond to any of the sub-pixel arrays (SPX1~SPX4) shown in FIG. 1. Although FIG. 2 shows a single sub-pixel array (SPX) for convenience of description, the scope or spirit of the disclosed technology is not limited thereto and it should be noted that the single sub-pixel array (SPX) of FIG. 2 may also have substantially the same structure and operation as those of other sub-pixel arrays.

Referring to FIG. 2, the sub-pixel array (SPX) may include first to fourth photoelectric conversion elements (PD1, PD2, PD3, PD4), first to fourth transfer transistors (TX1, TX2, TX3, TX4), a reset transistor (RX), a selection transistor (SX) and a drive transistor (DX). The circuit structure of FIG. 2 is merely an example and the sub-pixel array (SPX) is not limited thereto. For example, the sub-pixel array (SPX) may further include a conversion gain transistor and a capacitor that are required to configure a conversion gain variable circuit.

In the sub-pixel array (SPX), the first to fourth photoelectric conversion elements (PD1, PD2, PD3, PD4) and the first to fourth transfer transistors (TX1, TX2, TX3, TX4) may be included in the four pixels (B1~B4) of FIG. 1. In more detail, the first photoelectric conversion element (PD1) and the first transfer transistor (TX1) may be included in the pixel (B1), the second photoelectric conversion element (PD2) and the second transfer transistor (TX2) may be included in the pixel (B2), the third photoelectric conversion element (PD3) and the third transfer transistor (TX3) may be included in the pixel (B3) and the fourth photoelectric conversion element (PD4) and the fourth transfer transistor (TX4) may be included in the pixel (B4).

The four pixels (B1~B4) of the sub-pixel array (SPX) may share a floating diffusion region (FD), a reset transistor (RX), a drive transistor (DX) and a selection transistor (SX). Although the floating diffusion region (FD), the reset transistor (RX), the drive transistor (DX) and the selection transistor (SX) may be distributed to and arranged in the pixels (B1~B4) and arrangement positions thereof may be variously changed.

Each of the first to fourth photoelectric conversion elements (PD1, PD1, PD3, PD4) may generate and accumulate photocharges in response to the amount of incident light or the intensity of incident light. The first to fourth photoelectric conversion elements (PD1, PD2, PD3, PD4) may correspond to four pixels (PXs) included in the unit sub-pixel array (SPX), respectively. For example, each of the first to fourth photoelectric conversion elements (PD1, PD2, PD3, PD4) may be implemented as a photodiode, a phototransistor, a photogate, a pinned photodiode or a combination thereof. When the first to fourth photoelectric conversion elements (PD1, PD2, PD3, PD4) are implemented as photodiodes, each photoelectric conversion element may be a region that is doped with second conductive impurities (e.g., N-type impurities) in a substrate including first conductive impurities (e.g., P-type impurities).

The first to fourth transfer transistors (TX1, TX2, TX3, TX4) may be connected between the floating diffusion region (FD) and the first to fourth photoelectric conversion elements (PD1, PD2, PD3, PD4). In more detail, the first transfer transistor (TX1) may be connected between the floating diffusion region (FD) and the first photoelectric conversion element (PD1), the second transfer transistor (TX2) may be connected between the floating diffusion region (FD) and the second photoelectric conversion element (PD2), the third transfer transistor (TX3) may be connected between the floating diffusion region (FD) and the third photoelectric conversion element (PD3) and the fourth transfer transistor (TX4) may be connected between the floating diffusion region (FD) and the fourth photoelectric conversion element (PD4). Charges accumulated in the first to fourth photoelectric conversion elements (PD1, PD2, PD3, PD4) may be transferred to the floating diffusion region (FD) through the first to fourth transfer transistors (TX1, TX2, TX3, TX4). In more detail, charges accumulated in the first photoelectric conversion element (PD1) may be transferred to the floating diffusion region (FD) through the first transfer transistor (TX1), charges accumulated in the second photoelectric conversion element (PD2) may be transferred to the floating diffusion region (FD) through the second transfer transistor (TX2), charges accumulated in the third photoelectric conversion element (PD3) may be transferred to the floating diffusion region (FD) through the third transfer transistor (TX3) and charges accumulated in the fourth photoelectric conversion element (PD4) may be transferred to the floating diffusion region (FD) through the fourth transfer transistor (TX4).

Gate electrodes (i.e., transfer gates) of the first to fourth transfer transistors (TX1, TX2, TX3, TX4) may be controlled by the first to fourth transfer signals (TG1, TG2, TG3, TG4), respectively. The first to fourth transfer signals (TG1, TG2, TG3, TG4) may be generated based on a row driver 110 (or a timing controller 140) shown in FIG. 6. The exposure times of the first to fourth photoelectric conversion elements (PD1, PD2, PD3, PD4) may be controlled by the first to fourth transfer signals (TG1, TG2, TG3, TG4), respectively.

For example, the first transfer signal (TG1) may turn on the first transfer transistor (TX1) to transfer charges accumulated in the first photoelectric conversion element (PD1) to the floating diffusion region (FD) and the first transfer transistor (TX1) may be turned off to control the first photoelectric conversion element (PD1) to accumulate charges. As soon as the charges are accumulated in the first to third photoelectric conversion elements (PD1, PD2, PD3), the exposure time may begin. Then, the exposure time may continue until the first transfer signal (TG1) turns on the first transfer transistor (TX1) again to transfer the accumulated charges to the floating diffusion region (FD). The duration of the exposure time may be determined based on an operation mode determined by a row driver (or a timing controller) to be described later.

As an example, the first to fourth transfer transistors (TX1, TX2, TX3, TX4) may correspond to the sub-pixel array (SPX1) shown in FIG. 1. Then, among the pixels (B1~B4) of the sub-pixel array (SPX1), the pixels (B1~B3) may correspond to the long-exposure pixels and the pixel B4 may correspond to the short-exposure pixel.

The floating diffusion region (FD) may accumulate photocharges received from the first to fourth photoelectric conversion elements (PD1, PD2, PD3, PD4). The first to fourth photoelectric conversion elements (PD1, PD2, PD3, PD4) may share the floating diffusion region (FD). That is, the plurality of pixels (PX) included in one unit sub-pixel array (SPX) may share the floating diffusion region (FD). The drive transistor (DX) may be controlled according to the amount of photocharges accumulated in the floating diffusion region (FD).

The reset transistor (RX) may reset charges accumulated in the floating diffusion region (FD). A drain electrode of the reset transistor (RX) may be connected to the floating diffusion region (FD) and a source electrode of the reset transistor (RX) may be connected to a pixel power-supply voltage (VDDPX). When the reset transistor (RX) is turned on according to a pixel reset signal (RG), the pixel power-supply voltage (VDDPX) may be transferred to the floating diffusion region (FD). In this case, the charges accumulated in the floating diffusion region (FD) may be discharged outside and the floating diffusion region FD may be reset.

The drive transistor (DX) may be a source follower buffer amplifier that generates a source-drain current in proportion to the amount of charges of the floating diffusion region (FD) connected to a gate electrode thereof. The drive transistor (DX) may be connected between the pixel power-supply voltage (VDDPX) input terminal and the selection transistor (SX). The drive transistor (DX) may amplify a potential change in the floating diffusion region (FD) and may output, through the selection transistor (SX), the amplified signal as a pixel signal (PS).

The selection transistor (SX) may select a sub-pixel array (SPX) to be read on a row basis. The selection transistor (SX) may be connected between the drive transistor (DX) and an output terminal of the pixel signal (PS). When the selection transistor (SX) is turned on by a selection signal (SG) provided from a row driver to be described later, an analog electrical signal output from the drive transistor (DX) may be output as the pixel signal (PS).

Figure 3:
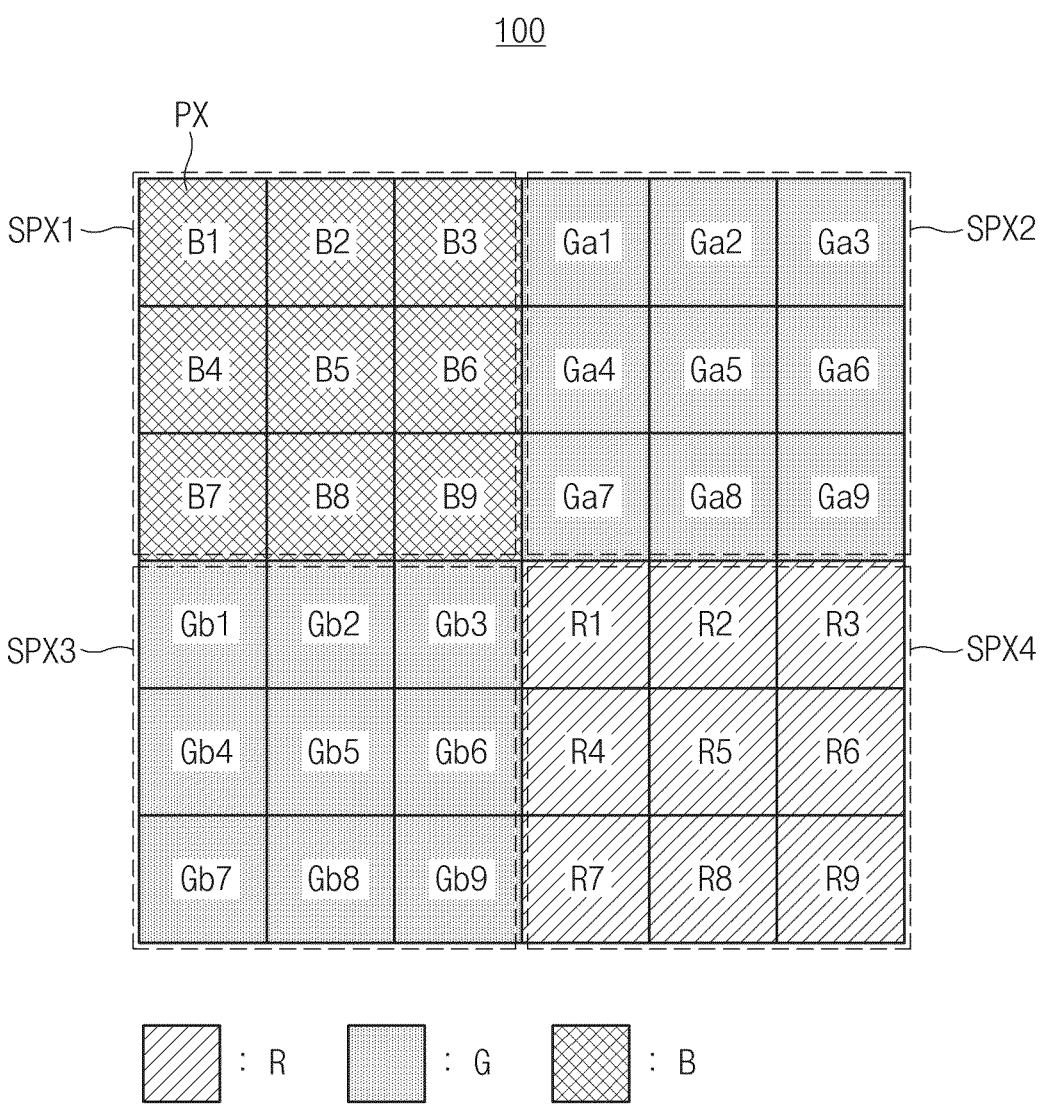

FIGS. 3 and 4 are schematic diagrams illustrating examples of the pixel array for use in the image sensing device based on some embodiments of the present disclosure.

Referring to FIG. 3, the pixel array 100 may include a plurality of sub-pixel arrays (SPX1~SPX4). Each of the plurality of sub-pixel arrays (SPX1~SPX4) may include (3×3) pixels including filters of the same color. For example, the pixel array 100 shown in FIG. 3 may have a pattern (so-called "nona-pattern") in which the sub-pixel arrays (SPX1~SPX4), each of which includes (3×3) pixels, are repeatedly arranged in the row and column directions.

For example, the sub-pixel array (SPX1) may include (3×3) pixels (i.e., a total of 9 pixels, B1~B9) including filters of the same color (e.g., blue 'B') and the (3×3) pixels may share one floating diffusion region (FD). The sub-pixel array (SPX2) may include (3×3) pixels (i.e., a total of 9 pixels, Ga1~Ga9) including filters of the same color (e.g., green 'G') and the (3×3) pixels may share one floating diffusion region (FD). The sub-pixel array (SPX3) may include (3×3) pixels (i.e., a total of 9 pixels, Gb1~Gb9) including filters of the same color (e.g., green 'G') and the (3×3) pixels may share one floating diffusion region (FD). The sub-pixel array (SPX4) may include (3×3) pixels (i.e., a total of 9 pixels, R1~R9) including filters of the same color (e.g., red 'R') and the (3×3) pixels may share one floating diffusion region (FD).

When the pixel array 100 includes 9 pixels as shown in FIG. 3, one sub-pixel array (e.g., sub-pixel array SPX1) may include 9 photoelectric conversion elements and 9 transfer transistors. The nine pixels (B1~B9) of the sub-pixel array (SPX1) may share a floating diffusion region (FD), a reset transistor (RX), a drive transistor (DX) and a selection transistor (SX). Although the floating diffusion region (FD), the reset transistor (RX), the drive transistor (DX) and the selection transistor (SX) may be distributed to and arranged in the pixels (B1~B9), arrangement positions thereof may be variously changed.

Referring to FIG. 4, the pixel array 100 may include a plurality of sub-pixel arrays (SPX1~SPX4). Each of the plurality of sub-pixel arrays (SPX1~SPX4) may include (4×4) pixels including filters of the same color. For example, the pixel array 100 shown in FIG. 4 may have a pattern (so-called "hexa-pattern") in which the sub-pixel arrays (SPX1~SPX4), each of which includes (4×4) pixels, are repeatedly arranged in the row and column directions.

For example, the sub-pixel array (SPX1) may include (4×4) pixels (i.e., a total of 16 pixels, B1~B16) including filters of the same color (e.g., blue 'B') and the (4×4) pixels may share one floating diffusion region (FD). The sub-pixel array (SPX2) may include (4×4) pixels (i.e., a total of 16 pixels, Ga1~Ga16) including filters of the same color (e.g., green 'G') and the (4×4) pixels may share one floating diffusion region (FD). The sub-pixel array (SPX3) may include (4×4) pixels (i.e., a total of 16 pixels, Gb1~Gb16) including filters of the same color (e.g., green 'G') and the (4×4) pixels may share one floating diffusion region (FD). The sub-pixel array (SPX4) may include (4×4) pixels (i.e., a total of 16 pixels, R1~R16) including filters of the same color (e.g., red 'R') and the (4×4) pixels may share one floating diffusion region (FD).

When the pixel array 100 includes 16 pixels as shown in FIG. 4, one sub-pixel array (e.g., sub-pixel array SPX1) may include 16 photoelectric conversion elements and 16 transfer transistors. The 16 pixels (B1~B16) of the sub-pixel array (SPX1) may share a floating diffusion region (FD), a reset transistor (RX), a drive transistor (DX) and a selection transistor (SX). Although the floating diffusion region (FD), the reset transistor (RX), the drive transistor (DX) and the selection transistor (SX) may be distributed to and arranged in the pixels (B1~B16), arrangement positions thereof may be variously changed.

FIG. 5 is a timing diagram illustrating example operations of the sub-pixel array shown in FIG. 2 based on some embodiments of the present disclosure.

Referring to FIG. 5, a logic high level may refer to a voltage level for activating (e.g., turning on) a corresponding element (e.g., a transistor) and a logic low level may refer to a voltage level for deactivating (e.g., turning off) a corresponding element (e.g., a transistor).

Among the pixels (B1~B4) described above in FIG. 1, the pixels (B1~B3) may correspond to long-exposure pixels and the pixel (B4) may correspond to a short-exposure pixel. Among the first to fourth transfer transistors (TX1, TX2, TX3, TX4), the first to third transfer transistors (TX1, TX2, TX3) may correspond to the long-exposure pixels (B1~B3), respectively. Among the first to fourth transfer transistors (TX1, TX2, TX3, TX4), the fourth transfer transistor (TX4) may correspond to the above-described short-exposure pixel (B4).

Referring to FIG. 5, in the sub-pixel array (SPX), when a pixel reset signal (RG) transitions to a logic high level in a time period (T1), the reset transistor (RX) may be turned on to reset charges accumulated in the floating diffusion region (FD).

During the time period (T1), when the first to third transfer signals (TG1, TG2, TG3) transition to a logic high level, the first to third transfer transistors (TX1, TX2, TX3) may be turned on. In more detail, when the first transfer signal (TG1) transitions to a logic high level, the first transfer transistor (TX1) may be turned on. When the second transfer signal (TG2) transitions to a logic high level, the second transfer transistor (TX2) may be turned on. When the third transfer signal (TG3) transitions to a logic high level, the third transfer transistor (TX3) may be turned on, Charges accumulated in the first to third photoelectric conversion elements (PD1, PD2, PD3) may be transferred to the floating diffusion region (FD) through the first to third transfer transistors (TX1, TX2, TX3) so that the first to third photoelectric conversion elements (PD1, PD2, PD3) may be reset. In more detail, charges accumulated in the first photoelectric conversion element (PD1) may be transferred to the floating diffusion region (FD) through the first transfer transistor (TX1) so that the first photoelectric conversion element (PD1) may be reset. Charges accumulated in the second photoelectric conversion element (PD2) may be transferred to the floating diffusion region (FD) through the second transfer transistor (TX2) so that the second photoelectric conversion element (PD2) may be reset. Charges accumulated in the third photoelectric conversion element (PD3) may be transferred to the floating diffusion region (FD) through the third transfer transistor (TX3) so that the third photoelectric conversion element (PD3) may be reset.

After a lapse of the time period (T1), when the first to third transfer signals (TG1, TG2, TG3) transition to a logic low level and the first to third transfer transistors (TX1, TX2, TX3) are turned off, charges can be accumulated in the first to third photoelectric conversion elements (PD1, PD2, PD3). As soon as the charges are accumulated in the first to third photoelectric conversion elements (PD1, PD2, PD3), the exposure time may begin. Then, the exposure time (LT1, LT2, LT3) may continue until the first to third transfer signals (TG1, TG2, TG3) turn on the first to third transfer transistors (TX1, TX2, TX3) again to transfer the accumulated charges to the floating diffusion region (FD).

That is, as can be seen from FIG. 5, the pixel (B1) may have an exposure time denoted by 'LT1', the pixel (B2) may have an exposure time denoted by 'LT2' and the pixel (B3) may have an exposure time denoted by 'LT3'. Here, the exposure times (LT1, LT2, LT3) may be substantially the same or have similar times.

In some embodiments, photocharges output from the first photoelectric conversion element (PD1), photocharges output from the second photoelectric conversion element (PD2) and photocharges output from the third photoelectric conversion element (PD3) may be transferred to the floating diffusion region (FD) at the same time point (e.g., T4).

Thereafter, when the pixel reset signal (RG) transitions back to the logic high level in a time period (T2), the reset transistor (RX) may be turned on to reset the charges accumulated in the floating diffusion region (FD).

During the time period (T2), when the fourth transfer signal (TG4) transitions to a logic high level, the fourth transfer transistor (TX4) may be turned on. Accordingly, the charges accumulated in the fourth photoelectric conversion element (PD4) may be transferred to the floating diffusion region (FD) through the fourth transfer transistor (TX4) so that the fourth photoelectric conversion element (PD4) can be reset.

After lapse of the time period (T2), when the fourth transfer signal (TG4) transitions to a logic low level and the fourth transfer transistor (TX4) is turned off, charges can be accumulated in the fourth photoelectric conversion elements (PD4). As soon as the charges are accumulated in the fourth photoelectric conversion element (PD4), the exposure time (ST) may begin. Then, the exposure time (ST) may continue until the fourth transfer signal (TG4) turns on the fourth transfer transistor (TX4) again to transfer the accumulated charges to the floating diffusion region (FD). That is, the pixels (B1~B3) each having a long exposure time may be charged with photocharges during the exposure times (LT1~LT3) and the pixel (B4) having a short exposure time may be charged with photocharges during the exposure time (ST).

Subsequently, in a time period (T3), when the pixel reset signal (RG) transitions to the logic high level again, the reset transistor (RX) may be turned on to reset the charges accumulated in the floating diffusion region (FD). After a lapse of the time period (T3), when the pixel reset signal (RG) transitions back to the logic low level, the reset transistor (RX) may be turned off.

Thereafter, in a time period (T4), when the first to third transfer signals (TG1, TG2, TG3) transition back to the logic high level, the first to third transfer transistors (TX1, TX2, TX3) may be turned on. Accordingly, the charges accumulated in the first to third photoelectric conversion elements (PD1, PD2, PD3) may be transferred to the floating diffusion region (FD) through the first to third transfer transistors (TX1, TX2, TX3), respectively. In some embodiments, when the first to third transfer transistors (TX1, TX2, TX3) are turned on, the long-exposure pixels (B1~B3) may transfer the photocharges generated during the exposure times (LT1~LT3) to the floating diffusion region (FD) at the same time point (T4).

Then, when the fourth transfer signal (TG4) transitions back to the logic high level in a time period (T5), the fourth transfer transistor (TX4) may be turned on. Accordingly, the charges accumulated in the fourth photoelectric conversion element (PD4) may be transferred to the floating diffusion region (FD) through the fourth transfer transistor (TX4). In some embodiments, after the first to third transfer transistors (TX1, TX2, TX3) are turned on, the short-exposure pixel (B4) needs not perform a separate reset operation but transfers the photocharges generated during the exposure time (ST) to the floating diffusion region (FD) at a time point (T5). That is, the sub-pixel array (SPX) may first read the image signals of the long-exposure pixels (B1~B3) in the time period (T4) and may then read the image signal of the short-exposure pixel (B4) in the time period (T5).

The sub-pixel array based on some embodiments of the present disclosure has been described as an example in which the long-exposure pixels (B1~B3) are first read out in the time period (T4) and the short-exposure pixel (B4) is then read out in the time period (T5), without being limited thereto. Alternatively, the sub-pixel array may first read out the short-exposure pixel (B4) and then read out the remaining long-exposure pixels (B1~B3). The order of reading out the long-exposure pixels (B1~B3) and the short-exposure pixel (B4) may be changed to another.

As shown in FIG. 5, a method in which a reset signal (that is read out from the time period T3), a high-sensitivity image signal (that is read out from the time period T4) and a low-sensitivity image signal (that is read out from the time period T5) are sequentially read out during a readout period of the sub-pixel array (SPX) may be referred to as a reset-signal-signal (RSS) readout method.

Namely, staggered HDR may refer to a technology capable of expanding a dynamic range of an HDR image by combining a plurality of images output through multiple exposures (i.e., multi-exposure). However, as the dynamic range of the HDR image is expanded when the HDR image is created, the frame rate may decrease. Further, staggered HDR can control the exposure conditions of the image sensor for each line so that the number of readout times required to detect the images having different exposure times may increase. In staggered HDR, when multiple image data having different exposure times are summed and then processed, noise may unavoidably increase.

Accordingly, the image sensing device based on some embodiments of the present disclosure may enable the pixel array 100 that includes the first to fourth photoelectric conversion elements (PD1~PD4) sharing both the reset transistor (RX) and the floating diffusion region (FD) to output multi-exposure image data within the same frame. As a result, when creating the HDR image, the image sensing device based on some embodiments of the present disclosure may increase the frame rate and may output a high-sensitivity image and a low-sensitivity image within only one frame, thereby reducing the amount of noise.

To acquire the HDR image, a plurality of frames for incident light with different exposure levels may be required. Here, the frame may refer to an image acquired when signals output from the unit pixels included in the pixel array 100 are detected once. On the other hand, the image sensing device based on some embodiments of the present disclosure may perform only one signal detection for each sub-pixel array (SPX) included in the pixel array 100 and may thus generate the pixel signal (PS) corresponding to the incident light having different exposure levels received from one pixel group (i.e., one sub-pixel array SPX). Therefore, the image sensing device based on some embodiments of the present disclosure can acquire the HDR image with only one frame.

In some embodiments, a time period (T6) may represent a "readout period". The readout period (T6) may include three periods (T3~T5). That is, when the time period (T6) begins after lapse of the time period (T2), the operation for reading out the pixel signal (PS) may be performed.

When the selection signal (SG) is activated to a logic high level in the time period (T6), the selection transistor (SX) may be turned on. In this state, when the pixel reset signal (RG) transitions to a logic high level in the time period (T3), the reset transistor (RX) is turned on and the reset signal can be read out. Thereafter, in the time period (T4), when the first to third transfer signals (TG1~TG3) transition to a logic high level, the pixel signal (PS) corresponding to the high-sensitivity image signal may be read out first. In the time period (T5), when the fourth transfer signal (TG4) transitions to a logic high level, the pixel signal (PS) corresponding to the low-sensitivity image signal may be read out. When the selection signal (SG) is deactivated to a logic low level after the time period (T5), the readout period (T6) may be ended.

In the time period (T4), the first to third photoelectric conversion elements (PD1~PD3) respectively included in the pixels (B1~B3) may transfer photocharges generated during the exposure times (LT1~LT3) to the floating diffusion region (FD) and such photocharges may be output as the pixel signal (PS) (also referred to as a "first pixel signal"). The pixels (B1~B3) may have filters of the same color, pixel signals output from the pixels (B1~B3) may be summed and the sum of the pixel signals output from the pixels (B1~B3) can be output as the pixel signal (PS). In the time period (T5), the fourth photoelectric conversion element (PD4) included in the pixel (B4) may transfer photocharges generated during the exposure time (ST) to the floating diffusion region (FD) and such photocharges may be output as the pixel signal (PS) (also referred to as a "second pixel signal"). The pixel signal (PS) output from the sub-pixel array (SPX) may be transferred to the image signal processor (ISP) through a readout circuit 120 shown in FIG. 6.

In the time period (T6), the image sensing device based on some embodiments of the present disclosure may output the pixel signals of the long-exposure pixels (B1~B3) and the pixel signal of the short-exposure pixel (B4) within only one frame. The readout circuit 120 may convert the pixel signal (PS) output from the pixel array 100 into image data (IDATA). For example, the image sensing device may subtract the component of the reset signal from the sum of three pixel signals (i.e., the first pixel signal) sensed by the long-exposure pixels (B1~B3), may subtract the component of the reset signal from the pixel signal (i.e., the second pixel signal) sensed by the short-exposure pixel (B4) and may output the resultant signal. As described above with reference to FIG. 2, the sub-pixel array (SPX) may be configured such that one floating diffusion region (FD) is shared by four transfer transistors (TX1~TX4). As a result, when the pixel reset signal (RG) is activated, the pixel signal (PS) of the pixels (B1~B4) can be output to the readout circuit 120 within only one frame. In this way, a method in which the image signal having multiple exposure times is generated and output within one frame may be referred to as a staggered HDR method.

Image data (IDATA) output from the readout circuit 120 may be transferred to and synthesized by the image signal processor (ISP). The image signal processor (ISP) may generate the HDR image by performing tone mapping processing on the image data (IDATA). That is, the image signal processor (ISP) can generate the HDR image by merging a high-sensitivity image signal and a low-sensitivity image signal.

Figure 6:
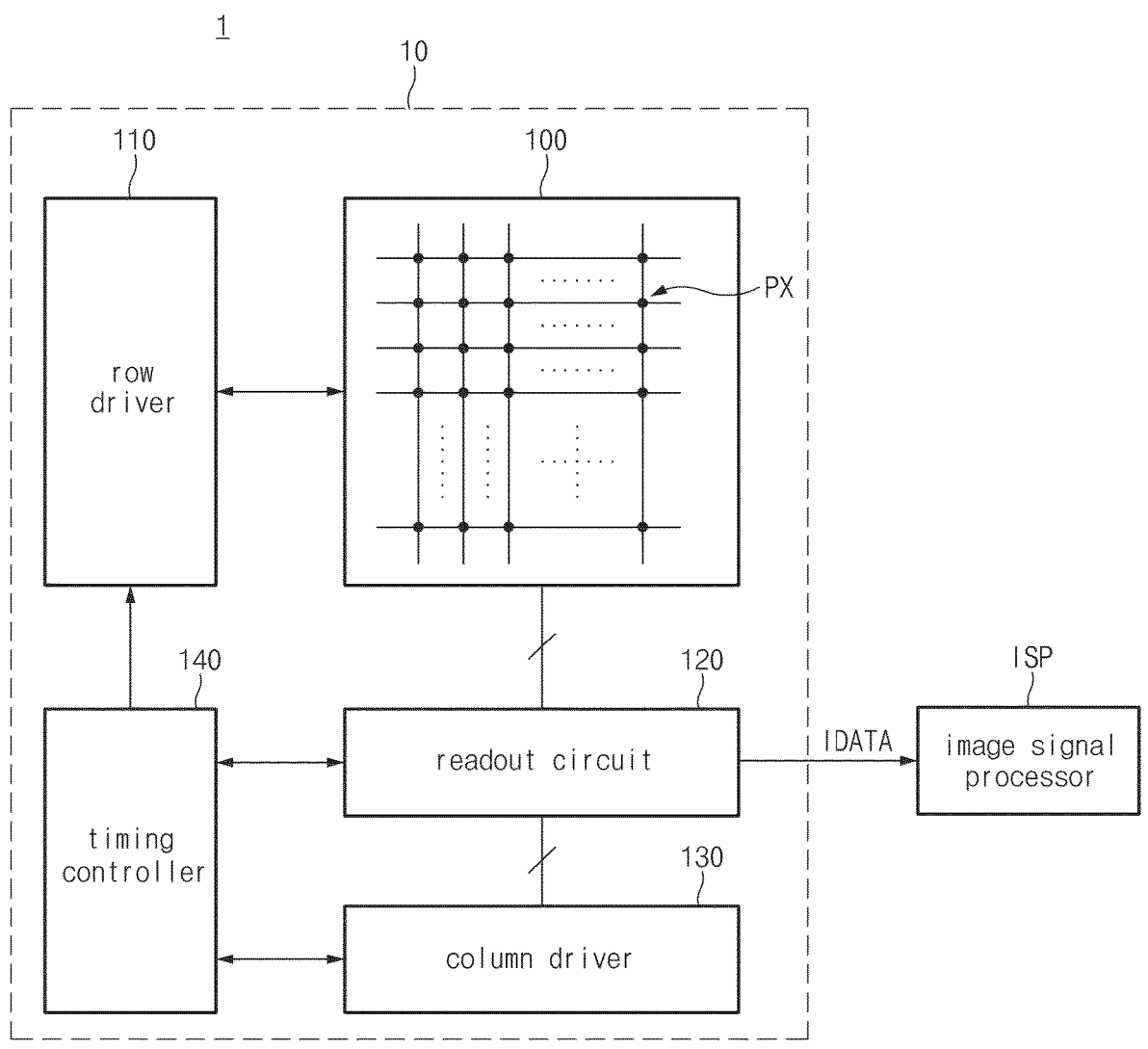
FIG. 6 is a block diagram illustrating an example of an imaging device based on some embodiments of the present disclosure.

FIG. 6 is a block diagram illustrating an example of an imaging device 1 based on some embodiments of the present disclosure.

Referring to FIG. 6, the imaging device 1 may refer to a device, for example, a digital still camera for photographing still images or a digital video camera for photographing moving images. For example, the imaging device 1 may be implemented as a Digital Single Lens Reflex (DSLR) camera, a mirrorless camera, or a smartphone and others. The imaging device 1 may include a device having both a lens and an image pickup element such that the device can capture (or photograph) a target object and can thus create an image of the target object.

The imaging device 1 may include an image sensing device 10 and an image signal processor (ISP).

The image sensing device 10 may be a complementary metal oxide semiconductor image sensor (CIS) for converting an incident light into an electrical signal. The image sensing device 10 may include a pixel array 100, a row driver 110, a readout circuit 120, a column driver 130 and a timing controller 140. The components of the image sensing device 10 illustrated in FIG. 6 are discussed by way of example only and the present disclosure encompasses numerous other changes, substitutions, variations, alterations and modifications.

The pixel array 100 may include a plurality of imaging pixels (PXs) arranged in a two-dimensional (2D) pixel array including rows and columns. The plurality of imaging pixels (PXs) may be consecutively arranged in the column direction and the row direction. The pixel array 100 based on some embodiments of the present disclosure may include the same structures as those in FIGS. 1 to 4 described above and may perform the same operations as those in FIG. 5. In another example, the plurality of imaging pixels (PXs) can be arranged in a three-dimensional (3D) pixel array. The plurality of imaging pixels may convert an optical signal into an electrical signal on a unit pixel basis or a pixel group basis, where pixels in a pixel group share at least certain internal circuitry.

The pixel array 100 may receive driving signals, including a row selection signal, a pixel reset signal and a transfer signal, from the row driver 110. Upon receiving the driving signal, corresponding imaging pixels in the pixel array 100 may be activated to perform the operations corresponding to the row selection signal, the pixel reset signal and the transfer signal. Each of the pixels (PXs) may generate photocharges corresponding to the intensity (or illuminance) of incident light and may generate an electrical signal having a magnitude corresponding to the amount of generated photocharges, thereby detecting the incident light.

The exposure time and sensitivity of the pixel array 100 may be adjusted by the timing controller 140. Each pixel (PX) of the pixel array 100 may have at least two different sensitivities. Here, the sensitivity may mean an increase in amount of image data IDATA (or an increase amount of a response) with respect to an increase in amount of the intensity of incident light. That is, as the sensitivity increases, the amount of increase in image data (IDATA) in response to an increase in the intensity of incident light increases. As the sensitivity decreases, the amount of increase in image data (IDATA) in response to an increase in the intensity of incident light decreases.

The row driver 110 may activate the pixel array 100 to perform certain operations on the imaging pixels in the corresponding row based on commands and control signals provided by controller circuitry such as the timing controller 140. In some embodiments, the row driver 110 may select one or more imaging pixels arranged in one or more rows of the pixel array 100. The row driver 110 may generate a row selection signal to select one or more rows among the plurality of rows.

The row driver 110 may sequentially enable the pixel reset signal for resetting imaging pixels (PXs) corresponding to at least one selected row and the transfer signal for the pixels (PXs) corresponding to the at least one selected row. Thus, a reference signal and an image signal, which are analog signals generated by each of the imaging pixels (PXs) of the selected row, may be sequentially transferred to the readout circuit 120. The reference signal may be an electrical signal that is provided to the readout circuit 120 when a sensing node of an imaging pixel (e.g., floating diffusion region) is reset and the image signal may be an electrical signal that is provided to the readout circuit 120 when photocharges generated by the imaging pixel are accumulated in the sensing node. The reference signal indicating unique reset noise of each pixel and the image signal indicating the intensity of incident light may be generically called a pixel signal as necessary.

The image sensing device 10 may use correlated double sampling (CDS) to remove undesired offset values of pixels known as the fixed pattern noise by sampling a pixel signal twice to remove the difference between these two samples. In one example, the correlated double sampling (CDS) may remove the undesired offset value of pixels by comparing pixel output voltages obtained before and after photocharges generated by incident light are accumulated in the sensing node so that only pixel output voltages based on the incident light can be measured.

In some embodiments of the present disclosure, the readout circuit 120 may sequentially sample and hold voltage levels of the reference signal and the image signal, which are provided to each of a plurality of column lines from the pixel array 100. That is, the readout circuit 120 may sample and hold the voltage levels of the reference signal and the image signal which correspond to each of the columns of the pixel array 100. That is, an analog-to-digital converter (ADC) included in the readout circuit 120 may sample and hold the pixel signal for each column upon receiving the pixel signal from each column line of the pixel array 100, may convert the resultant signal into digital signals (IDATA) and may output the digital signals (IDATA). In some embodiments, the ADC may be implemented as a ramp-compare type ADC. The ramp-compare type ADC may include a comparator circuit for comparing the analog pixel signal with a ramp signal that ramps up or down according to time and a timer (or counter) for performing counting until a voltage of the ramp signal matches the analog pixel signal.

The column driver 130 may select a column of the readout circuit 120 upon receiving a control signal from the timing controller 140 and may sequentially output the image data (IDATA), which are temporarily stored in the selected column of the readout circuit 120. In some embodiments, upon receiving an address signal from the timing controller 140, the column driver 130 may generate a column selection signal based on the address signal and may select a column of the readout circuit 120, thereby outputting the image data (IDATA) as an output signal from the selected column of the readout circuit 120.

The timing controller 140 may control operations of at least one of the row driver 110, the readout circuit 120 and the column driver 130. The timing controller 140 may provide the row driver 110, the readout circuit 120 and the column driver 130 with a clock signal required for the operations of the respective components of the image sensing device 10, a control signal for timing control and address signals for selecting a row or column.

The image signal processor (ISP) may perform image processing of image data received from the image sensing device 10. The image signal processor (ISP) may reduce noise of image data and may perform various types of image signal processing (e.g. interpolation, synthesis, gamma correction, color filter array interpolation, color matrix, color correction, color enhancement, lens distortion correction, etc.) for image-quality improvement of the image data.

In addition, the image signal processor (ISP) may compress image data that has been created by execution of image signal processing for image-quality improvement, such that the image signal processor (ISP) can create an image file using the compressed image data. Alternatively, the image signal processor (ISP) may recover image data from the image file. In this case, the scheme for compressing such image data may be a reversible format or an irreversible format. As a representative example of such compression format, in the case of using a still image, Joint Photographic Experts Group (JPEG) format, JPEG 2000 format, or the like can be used. In addition, in the case of using moving images, a plurality of frames can be compressed according to Moving Picture Experts Group (MPEG) standards such that moving image files can be created. For example, the image files may be created according to Exchangeable image file format (Exif) standards.

The image signal processor (ISP) may generate an HDR image by synthesizing at least two images having different sensitivities. For example, the image sensing device 10 may output a low-sensitivity image generated from a low-sensitivity pixel with a relatively lower sensitivity and a high-sensitivity image generated from a high-sensitivity pixel with a relatively higher sensitivity. The image signal processor (ISP) may combine the low-sensitivity image and the high-sensitivity image, resulting in formation of an HDR image. Here, the low-sensitivity and the high-sensitivity may correspond to relative concepts, the image sensing device 10 may generate image data (IDATA) having at least N different sensitivities, where N is an integer of 2 or more.

The image signal processor (ISP) may perform HDR processing on image data (IDATA). Here, HDR processing may include linearization processing and Dynamic Range Compression (DRC) processing. DRC processing may include tone mapping (e.g., gamma correction). Depending on such tone mapping, relatively bright areas of the image may be corrected to be dark and relatively dark areas of the image may be corrected to be bright. As HDR processing is performed on the merged image and at least one image, an HDR image with an increased dynamic range and improved SNR (signal to noise ratio) may be generated. Various image processes described above may be performed on the HDR image. However, the scope or spirit of the disclosed technology is not limited thereto and at least one of the various image processes for accurate and clear expression of images may also be performed during HDR processing.

The image signal processor (ISP) may transmit the ISP image data to a host device (not shown). The host device (not shown) may be a processor (e.g. an application processor) for processing the ISP image data received from the image signal processor (ISP), a memory (e.g. a non-volatile memory) for storing the ISP image data, or a display device (e.g. a liquid crystal display (LCD)) for visually displaying the ISP image data.

In addition, the image signal processor (ISP) may transmit a control signal for controlling operations (e.g. whether or not to operate, an operation timing, an operation mode, etc.) of the image sensing device 10 to the image sensing device 10.

As is apparent from the above description, the image sensing device based on embodiments of the present disclosure can reduce the amount of noise during a readout action while reducing loss of a frame rate.

The embodiments of the present disclosure may provide a variety of effects capable of being directly or indirectly recognized through the present disclosure.

Although a number of illustrative embodiments have been described, it should be understood that modifications and enhancements to the disclosed embodiments and other embodiments can be devised based on what is described and/or illustrated in the present disclosure. Furthermore, the embodiments may be combined to form additional embodiments.

What is claimed is:

1. An image sensing device comprising:
a first pixel configured to generate a first pixel signal based on light received during a first exposure time; and
a second pixel disposed to share a floating diffusion region with the first pixel and configured to generate a second pixel signal based on light received during a second exposure time different from the first exposure time,
wherein, when the floating diffusion region is reset based on a pixel reset signal in a first period, a reset signal is read out, the first pixel signal is read out in a second period and the second pixel signal is read out in a third period, and
wherein the first period, the second period and the third period are included in one frame,
wherein the first period, the second period and the third period are consecutive periods, and
wherein the first pixel signal and the second pixel signal are read out sequentially.

2. The image sensing device according to claim 1, wherein the first pixel includes:
a first photoelectric conversion element configured to generate and accumulate charges based on intensity of the light received during the first exposure time; and
a first transfer transistor connected between the first photoelectric conversion element and the floating diffusion region and controlled by a first transfer signal.

3. The image sensing device according to claim 2, wherein the second pixel includes:

a second photoelectric conversion element configured to generate and accumulate charges based on intensity of the light received during the second exposure time; and
a second transfer transistor connected between the second photoelectric conversion element and the floating diffusion region and controlled by a second transfer signal.

4. The image sensing device according to claim 3, wherein:
in a first reset period before the first period,
the floating diffusion region is reset based on the pixel reset signal, and
the first photoelectric conversion element transfers, when the first transfer transistor is turned on based on the first transfer signal, the charges accumulated therein to the floating diffusion region so that the first photoelectric conversion element is reset.

5. The image sensing device according to claim 4, wherein:
in a second reset period after the first reset period and before the first period,
the floating diffusion region is reset based on the pixel reset signal, and
the second photoelectric conversion element transfers, when the second transfer transistor is turned on based on the second transfer signal, the charges accumulated therein to the floating diffusion region so that the second photoelectric conversion element is reset.

6. The image sensing device according to claim 1, further comprising a selection transistor configured to stay turned on during the one frame according to a selection signal.

7. An imaging device comprising:
an image sensing device including a pixel array configured to generate a plurality of pixel signals having different sensitivities based on a received light; and
an image signal processor configured to generate an image by synthesizing the plurality of pixel signals,
wherein the pixel array includes:
a first pixel configured to generate a first pixel signal based on light received during a first exposure time;
a second pixel disposed to share a floating diffusion region with the first pixel and configured to generate a second pixel signal based on light received during the first exposure time; and
a third pixel disposed to share the floating diffusion region with the first pixel and the second pixel and configured to generate a third pixel signal based on light received during a second exposure time different from the first exposure time,
wherein, when the floating diffusion region is reset based on a pixel reset signal in a first period, a reset signal is read out, a sum of the first pixel signal and the second pixel signal is read out in a second period and the third pixel signal is read out in a third period
wherein the image signal processor is configured to generate the image by synthesizing a first signal and a second signal, and
wherein the first signal is obtained by subtracting a component of the reset signal from a value corresponding to the sum of the first pixel signal and the second pixel signal and the second signal is obtained by subtracting a component of the reset signal from the third pixel signal.

8. The imaging device according to claim 7, wherein the first period, the second period and the third period are included in one frame.

9. The imaging device according to claim 7, wherein the first to third pixels have filters of the same color.

10. The imaging device according to claim 7, wherein the first period, the second period and the third period are consecutive periods.

11. The imaging device according to claim 7, wherein each of the first to third pixels includes:

a photoelectric conversion element configured to generate and accumulate charges based on intensity of the light received during a corresponding one of the first exposure time and the second exposure time; and a transfer transistor connected between the photoelectric conversion element and the floating diffusion region and controlled by a transfer signal.

12. The imaging device according to claim 11, wherein the pixel array includes:

a reset transistor connected between the floating diffusion region and a power-supply voltage input terminal and controlled by the pixel reset signal;

a drive transistor connected to the power-supply voltage input terminal and having a gate terminal connected to the floating diffusion region; and a selection transistor connected between the drive transistor and an output terminal of a pixel signal and controlled by a selection signal, and wherein the reset transistor, the drive transistor and the selection transistor are shared by the first to third pixels.

13. The imaging device according to claim 12, wherein the selection transistor is configured to stay turned on during a section including the first to third periods.

14. The imaging device according to claim 11, wherein:

in a first reset period before the first period, the floating diffusion region is reset based on the pixel reset signal; and the photoelectric conversion elements respectively included in the first and second pixels transfer, when the transfer transistors respectively included in the first pixel and the second pixel are turned on, charges accumulated therein to the floating diffusion region so that the photoelectric conversion elements respectively included in the first and second pixels is reset.

15. The imaging device according to claim 14, wherein:

in a second reset period after the first reset period and before the first period, the floating diffusion region is reset based on the pixel reset signal; and the photoelectric conversion element included in the third pixel transfers, when the transfer transistor included in the third pixel is turned on, charges accumulated therein to the floating diffusion region so that the photoelectric conversion element included in the third pixel is reset.

16. An image sensing device comprising:

a first pixel including:

a first photoelectric conversion element configured to generate and accumulate charges based on intensity of light; and a first transfer transistor connected between the first photoelectric conversion element and a floating diffusion region and controlled by a first transfer signal, wherein the first pixel is configured to output a first pixel signal to the floating diffusion region that has been reset;

a second pixel including:

a second photoelectric conversion element configured to generate and accumulate charges based on the intensity of light; and a second transfer transistor connected between the second photoelectric conversion element and the floating diffusion region and controlled by a second transfer signal, wherein the second pixel is configured to output a second pixel signal to the floating diffusion region that has been reset; and a third pixel including:

a third photoelectric conversion element configured to generate and accumulate charges based on the intensity of light; and a third transfer transistor connected between the third photoelectric conversion element and the floating diffusion region and controlled by a third transfer signal, wherein the third pixel is configured to output a third pixel signal to the floating diffusion region that has been reset, and wherein, when the floating diffusion region is reset based on a pixel reset signal in a first period, a reset signal is read out, a sum of the first pixel signal and the second pixel signal is read out in a second period and the third pixel signal is read out in a third period, wherein the first period, the second period and the third period are included in one frame, wherein:

each of the first and second photoelectric conversion elements is configured to receive the light during a first exposure time, and the third photoelectric conversion element is configured to receive the light during a second exposure time different from the first exposure time.

* * * * *